Patented Nov. 10, 1953

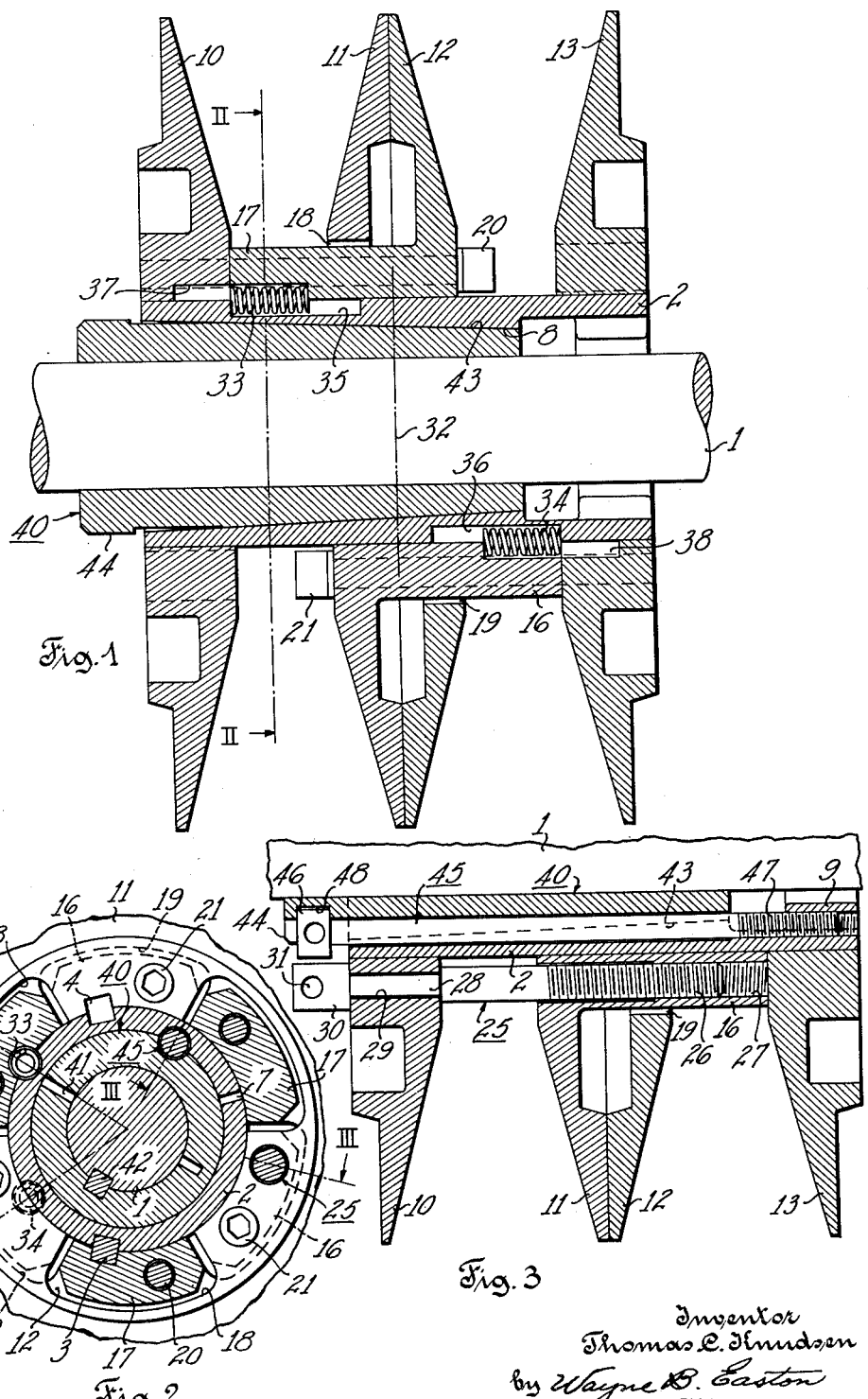

2,658,401

UNITED STATES PATENT OFFICE 2,658,401

ADJUSTABLE PITCH SHEAVE

Thomas C. Knudsen, Wauwatosa, Wis., assignor to Allis-Chalmers Manufacturing Company, Milwaukee, Wis.

Application March 12, 1952, Serial No. 276,153

7 Claims. (Cl. 74—230.17)

1

This invention relates to an improvement in expansible V-belt sheaves of the type in which opposed frusto-conical surfaces are axially movable toward and away from each other to increase and decrease the effective pitch diameter of the sheave.

More specifically the invention pertains to adjustable pitch, multiple groove, V-belt sheaves of the type comprising two movable sets of conical disks, each set comprising a plurality of disks in alternating relation with disks of the other set, the disks of each set being spaced adjacent to disks of the same set by rigid connecting means which pass through apertures in the intervening disks of the other set.

A general object of the invention is to provide a variable pitch, multiple groove, V-belt sheave embodying two relatively movable sets of disks which can be axially moved toward or away from each other to vary the effective pitch diameter of the sheave without disturbing the alignment of the belts carried thereby. It is a further object of the invention to provide means for clamping the sets of disks on their support member after the desired pitch diameter adjustment is made to prevent the belts from "hunting" for their positions of alignment.

Another object of the invention is to provide new and improved belt alignment means for a variable pitch sheave which permits the actuating arrangement for varying the pitch diameter of the sheave to be very simple and inexpensive to manufacture.

Other objects and advantages will appear from the following description and drawing in which:

Fig. 1 is a view of a multiple groove sheave embodying the invention, shown in section on a longitudinal plane through the axis of rotation and taken on line I—I of Fig. 2;

Fig. 2 is a cross sectional view taken on line II—II of Fig. 1; and

Fig. 3 is a fragmentary view, in section, taken on line III—III of Fig. 2.

The illustrated sheave is shown mounted on a drive shaft 1 which may be either a driven or driving member. The sheave has a rotary power transmission member or support member 2 adapted for attachment to rotary shaft 1 in the way illustrated in the drawing and described hereinafter or in various other ways known to those skilled in the art. Support member 2 has a generally cylindrical external surface and is provided with two conventional longitudinally extending keyways in its exterior surface in which keys 3 and 4 are disposed.

On support member 2 are provided a series of annularly shaped disk members 10, 11, 12 and 13. Disks 10 and 13 are termed end disks and each is annular in form with a central opening bounded by a substantially continuous bearing surface. Disks 10 and 13 have conventional keyways which fit keys 3 and 4 respectively and have frusto-conical belt engaging faces mutually facing each other.

The scope of the invention includes a construction utilizing end disks 10 and 13 alone as well as constructions in which end disks 10 and 13 are utilized with two or more intermediate disks 11 and 12. Intermediate disks 11 and 12, also having frusto-conical belt engaging faces, are generally annular in form and are respectively axially spaced from and clamped to end disks 13 and 10 so as to form two sets of oppositely facing disks. The two sets of disks are axially movable with respect to each other and support member 2. When two or more intermediate disks are utilized, the disks of the two sets are alternately arranged to form cooperating pairs of oppositely facing disks, the faces being movable toward and away from each other to increase and decrease the effective diameter of the pulley.

A preferred way of spacing and clamping the disks in each of the two sets is illustrated although other known ways may be utilized within the scope of the invention. Intermediate disks 11 and 12 are respectively formed with axially extending lugs 16 and 17 which are circumferentially spaced so that the lugs on each disk form an annular series. Between the respective lugs of disks 11 and 12 are openings 18 and 19 such that in assembly the set of lugs on each disk is interdigitated and passes through the openings between the set of lugs on the other disk. Suitable tie bolts 20 and 21 are passed through suitable holes in the lugs and end disk of their respective sets of disks and serve to clamp together the respective disks of each set so that the two sets of disks are axially movable as units relative to each other and support member 2. One lug 16 has a longitudinal keyway cooperating with key 4 and one lug 17 has a longitudinal keyway cooperating with key 3, to prevent rotation of the respective sets of disks relative to support member 2.

Means are provided for positively adjusting the axial positions of the two sets of disks relative to each other to increase and decrease the effective pitch diameter of the sheave. Several known means for adjusting the pitch diameter of a sheave may be utilized within the scope of the present invention but the means illustrated in the drawing is preferred because of its simplicity. The illustrated adjusting means comprises an actuating screw 25 adapted to be axially fixed relative to one set of disks and adapted for threaded engagement with the other set of disks. Screw 25, which is arranged parallel to support member 2 and is rotatable about its own axis, operates to positively move the disks of each pair of belt engaging disks (such as disks 10 and 11) axially toward each other when the screw is rotated in one direction and axially away from each other when the screw is rotated in the opposite direction. Structurally, actuating screw 25 comprises a threaded section 26 adapted for threaded engagement with a threaded longitudinal bore 27 in disk 11 and a stem 28, of smaller diameter than threaded section 26, adapted to extend through a hole 29 in disk 10. A collar 30 is secured to stem 28 so as to axially fix disk 10 relative to screw 25. Collar 30 is provided with a hole 31 in which a rod (not shown) may be inserted for rotating screw 25 to cause axial movement of disk 11 relative to disk 10 and disk 13 relative to disk 12.

The structure described thus far includes means for positively adjusting the axial positions of the two sets of disks axially relative to each other but not with respect to support member 2. Of importance in the present invention is the providing of new and improved belt alignment means for positioning the two sets of disks relative to support member 2 so that the pitch diameter of the sheave may be adjusted by means of an actuating device, such as actuating screw 25, without disturbing the axial positions of the belts (not shown) relative to support member 2. The function of the belt alignment means is to maintain the two sets of disks axially symmetrical relative to a plane extending normal to and passing through a predetermined point on support member 2. The plane is represented by broken line 32 in Fig. 1.

In general the belt alignment means comprises resilient means, such as helical spring 33, positioned between support member 2 and the first set of disks (represented by disks 10 and 12) for biasing the first set in an axial direction and resilient means, such as a helical spring 34, positioned between support 2 and the second set of disks (represented by disks 11 and 13) for biasing the second set in the opposite axial direction. Although the illustrated arrangement for the belt alignment means is preferred, it should be understood that other embodiments could be devised. In the illustrated belt alignment arrangement, longitudinally extending recesses 35 and 36 are formed in the external surface of support member 2 and longitudinally extending recesses 37 and 38, formed respectively in the two sets of disks, are radially adjacent and cooperable respectively with recesses 35 and 36 to form pockets in which helical springs 33 and 34 are disposed. Recess 37 is conveniently formed partially in the bearing surface of disk 10 and partially in lug 17 of disk 12; recess 38 is conveniently formed partially in the bearing surface of disk 13 and partially in lug 16 of disk 11. Abutment surfaces are formed at each end of each of the recesses 35, 36, 37 and 38 for abutting engagement with springs 33 and 34. Considering the axial space between the left side of recess 35 and the right side of recess 36 it is seen that the portion of this space occupied by springs 33 and 34 depends on the positions relative to each other of disk 11 in one set of disks and disk 12 in the other set of disks. In operation the actuating screw 25 functions to positively adjust the axial positions of the sets of disks relative to each other, and springs 33 and 34, by exerting equal and opposite forces on the respective sets of disks, function to maintain the sets of disks axially symmetrical relative to a predetermined point on support member 2, the point being represented by line 32 in Fig. 1.

When the disks of each cooperating pair of mutually facing disks are in a position such that the rear surfaces of disks 11 and 12 abut, as in the position shown in the drawing, the effective pitch diameter of the sheave is at its smallest. By virtue of the manner in which actuating screw 25 cooperates with the two sets of disks, as described above, the sheave can be adjusted to assume various pitch diameters throughout a wide range in that disks 10 and 11, as well as disks 12 and 13, may be moved toward each other until they reach abutting relation in which the effective pitch diameter of the pulley is at its greatest.

A preferred way of attaching support member 2 to shaft 1 is illustrated in the drawing. Mounted directly on shaft 1 is a sleeve 40 centrally bored for a sliding fit on shaft 1 and split throughout its length along a radial plane as at 41, the split or cut being of sufficient width to permit sleeve 40 to be contracted by clamping to tightly grip shaft 1. The shaft and sleeve may be provided with conventional key means indicated at 42. The outer surface of sleeve 40 is divided into a tapered portion 43 and a shoulder portion 44. Support member 2 is illustrated as being radially expansible by virtue of being split throughout its length along a substantially radial plane as at 7 and is provided with a tapered bore 8 having the same taper angle as tapered portion 43 of sleeve 40. Axial movement of support member 2 with respect to sleeve 40 causes sleeve 40 to contract radially so as to grip shaft 1 and causes support member 2 to expand radially so as to expand against and clamp disks 10, 11, 12 and 13 to the support member. The clamping action unites all the parts into a rigid power transmission unit.

A screw 45 having a head portion 46 and a threaded section 47, is provided for moving support member 2 axially with respect to sleeve 40 to effect clamping and unclamping of the disks 10, 11, 12 and 13 to shaft 1. A slot 48 is provided in shoulder portion 44 of sleeve 40 in which the head portion 46 of screw 45 is extendable to anchor screw 45 axially with respect to sleeve 40. A hole for receiving the shank portion of screw 45 is formed partly in the internal surface of support member 2 and partly in the external surface of sleeve 40 such that screw 45 may also have the function of a driving key between these members. Support member 2 has an internal annular lug 9 at one end thereof provided with a threaded bore for receiving threaded section 47 of screw 45. Rotation of screw 45 therefor causes axial movement of support member 2 with respect to sleeve 40 to effect clamping of the disks to shaft 1.

In operation the screw 45 may be rotated to unclamp the disks from shaft 1 so that the desired pitch diameter may be obtained by rotatably adjusting actuating screw 25. Screw 45 may then be rotated to clamp the disks to shaft 1 to unite all parts into a rigid power transmission unit.

The particular embodiment of the invention illustrated and described herein is illustrative only, and the invention includes such other modifications and equivalents as may readily occur to those skilled in the art, within the scope of the appended claims.

It is claimed and desired to secure by Letters Patent:

1. A variable pitch sheave comprising a support member with a generally cylindrical external surface, first and second annularly shaped belt engaging disks slidably mounted on said support member, actuating means engaging said disks for positively adjusting the axial positions of said disks relative to each other to vary the effective pitch diameter of the sheave, and belt alignment means for maintaining said disks axially symmetrical relative to a predetermined point on said support member which comprises first resilient means between said first disk and said support member for biasing said first disk in an axial direction and second resilient means between said second disk and said support member for biasing said second disk in the opposite axial direction.

2. A variable pitch sheave comprising a support member with a generally cylindrical external surface, first and second annularly shaped belt engaging disks slidably mounted on said support member, means engaging said disks for positively adjusting the axial positions of said disks relative to each other to vary the effective pitch diameter of the sheave comprising an actuating screw axially fixed relative to one of said disks and threadedly engaging the other of said disks, and belt alignment means for maintaining said disks axially centered relative to a predetermined point on said support member which comprises first resilient means between said first disk and said support member for biasing said first disk in an axial direction and second resilient means between said second disk and said support member for biasing said second disk in the opposite axial direction.

3. A variable pitch sheave comprising a support member with a generally cylindrical external surface, a first set of axially spaced annular belt engaging disks slidably mounted on said support member and clamped together to form a unitary set, a second set of axially spaced annular belt engaging disks slidably mounted on said support member in respective alternating relation with respect to the disks of said first set and clamped together to form a unitary set, actuating means engaging said sets of disks for positively adjusting the axial positions of said sets of disks relative to each other to vary the effective pitch diameter of the sheave, and belt alignment means for maintaining said sets of disks axially symmetrical relative to a predetermined point on said support member which comprises first resilient means between said first set of disks and said support member for biasing said first set of disks in an axial direction and second resilient means between said second set of disks and said support member for biasing said second set of disks in the opposite axial direction.

4. A variable pitch sheave comprising a support member having a generally cylindrical external surface with two longitudinally extending recesses formed therein, two relatively movable sets of axially spaced annular belt engaging disks slidably mounted on said support member respectively having two longitudinally extending recesses radially adjacent and cooperable respectively with said recesses of said support member to define two pockets, actuating means engaging said sets of disks for positively adjusting the axial positions of said sets of disks relative to each other to vary the effective pitch diameter of the sheave, and belt alignment means for maintaining said sets of disks axially centered relative to a predetermined point on said support member comprising first resilient means disposed in one of said pockets for biasing one of said sets of disks in an axial direction relative to said support member and second resilient means disposed in the other of said pockets for biasing the other of said sets of disks in the opposite axial direction relative to said support member.

5. A variable pitch sheave comprising a support member having a generally cylindrical external surface with two longitudinally extending recesses formed therein, two relatively movable sets of axially spaced annular belt engaging disks slidably mounted on said support member with the disks in each set being arranged in alternating relation with the disks in the other set, a lug extending axially between two adjacent disks in each set of disks having a longitudinally extending recess radially adjacent and cooperable with said recesses of said support member respectively to define two pockets, actuating means engaging said sets of disks for positively adjusting the axial positions of said sets of disks relative to each other to vary the effective pitch diameter of the sheave, and belt alignment means for maintaining said sets of disks axially centered relative to a predetermined point on said support member comprising first resilient means disposed in one of said pockets for biasing one of said sets of disks in an axial direction relative to said support member and second resilient means disposed in the other of said pockets for biasing the other of said sets of disks in the opposite axial direction relative to said support member.

6. A variable pitch sheave comprising a support member having a generally cylindrical external surface with two longitudinally extending semicylindrically shaped recesses formed therein, two relatively movable sets of axially spaced annular belt engaging disks slidably mounted on said support member respectively having two longitudinally extending semicylindrically shaped recesses radially adjacent and cooperable respectively with said recesses of said support member to define two cylindrically shaped pockets, actuating means engaging said sets of disks for positively adjusting the axial positions of said sets of disks relative to each other to vary the effective pitch diameter of the sheave, and belt alignment means for maintaining said sets of disks axially centered relative to a predetermined point on said support member comprising two helical springs respectively disposed in said pockets for respectively biasing said sets of disks in opposite axial directions relative to said support member.

7. A variable pitch sheave comprising a support member having a generally cylindrical external surface with two longitudinally extending semicylindrically shaped recesses formed therein, two relatively movable sets of axially spaced annular belt engaging disks slidably mounted on said support member respectively having two longitudinally extending semicylindrically shaped recesses radially adjacent and cooperable respectively with said recesses of said support member to define two cylindrically shaped pockets, actuating means engaging said sets of disks for positively adjusting the axial positions of said sets of disks relative to each other to vary the effective pitch diameter of the sheave comprising an actuating screw axially fixed relative to one of said sets of disks and threadedly engaging the other of said sets of disks, and belt alignment means for maintaining said sets of disks axially centered relative to a predetermined point on said support member comprising two helical springs respectively disposed in said pockets for respectively biasing said sets of disks in opposite axial directions relative to said support member.

THOMAS C. KNUDSEN.

References Cited in the file of this patent

UNITED STATES PATENTS

| Number | Name | Date |
| --- | --- | --- |
| 2,610,515 | Williams | Sept. 16, 1952 |